(12) United States Patent
Schmitt

(10) Patent No.: US 7,523,946 B2
(45) Date of Patent: Apr. 28, 2009

(54) EXPANDABLE CHUCK

(75) Inventor: Peter J. Schmitt, Williamson, NY (US)

(73) Assignee: Xerox Corporation, Norwalk, CT (US)

( * ) Notice: Subject to any disclaimer, the term of this patent is extended or adjusted under 35 U.S.C. 154(b) by 94 days.

(21) Appl. No.: 11/155,500

(22) Filed: Jun. 20, 2005

(65) Prior Publication Data
US 2006/0284384 A1 Dec. 21, 2006

(51) Int. Cl.
*B23B 31/40* (2006.01)
(52) U.S. Cl. .................. 279/2.22; 269/48.1; 242/571.1; 399/117
(58) Field of Classification Search ........... 279/2.01, 279/2.21, 2.22, 2.05, 2.1, 2.17, 139; 242/571.1, 242/571.8, 571, 572, 576; 269/48.1; 399/117, 399/159; B23B 31/40
See application file for complete search history.

(56) References Cited

U.S. PATENT DOCUMENTS

| | | | | |
|---|---|---|---|---|
| 450,323 | A | * | 4/1891 | Tomlinson et al. ........ 15/104.19 |
| 1,246,130 | A | * | 11/1917 | Macready .................... 242/572 |
| 1,479,253 | A | * | 1/1924 | Rivetta ..................... 242/358.1 |
| 1,539,972 | A | * | 6/1925 | Todd ........................ 242/130.1 |
| 1,685,380 | A | * | 9/1928 | Shultz ...................... 15/104.19 |
| 2,437,100 | A | * | 3/1948 | Lambach .................. 242/130.1 |
| 2,542,491 | A | * | 2/1951 | Engel ............................. 69/19 |
| 2,801,503 | A | * | 8/1957 | Pass ............................. 451/507 |
| 3,113,744 | A | * | 12/1963 | Nisenson .................... 242/572 |
| 3,811,636 | A | * | 5/1974 | Muchnick ................. 242/129.5 |
| 3,977,687 | A | * | 8/1976 | Manganelli ................ 279/2.22 |
| 3,980,250 | A | * | 9/1976 | Persson .................... 242/129.5 |
| 4,168,073 | A | * | 9/1979 | LaRue ....................... 279/2.09 |
| 4,265,990 | A | | 5/1981 | Stolka et al. |
| 4,266,990 | A | | 5/1981 | Momma et al. |
| 4,390,611 | A | | 6/1983 | Ishikawa et al. |
| 4,551,404 | A | | 11/1985 | Hiro et al. |
| 4,588,667 | A | | 5/1986 | Jones et al. |
| 4,596,754 | A | | 6/1986 | Tsutsui et al. |
| 4,797,337 | A | | 1/1989 | Law et al. |
| 5,297,905 | A | * | 3/1994 | Schmidt et al. ............. 408/145 |
| 5,693,372 | A | | 12/1997 | Mistrater et al. |
| 5,725,667 | A | | 3/1998 | Petropoulos et al. |
| 5,743,538 | A | * | 4/1998 | Schmitt et al. ............. 279/2.17 |
| 5,788,774 | A | | 8/1998 | Mccumiskey et al. |
| 5,829,759 | A | | 11/1998 | Swain et al. |
| 5,829,760 | A | * | 11/1998 | Mistrater et al. ........... 279/2.22 |
| 5,938,379 | A | * | 8/1999 | Tseng ........................ 408/199 |
| 6,214,419 | B1 | | 4/2001 | Dinh et al. |
| 6,412,766 | B2 | * | 7/2002 | Barbieux ................... 269/48.1 |
| 6,852,364 | B2 | * | 2/2005 | Schmitt et al. ............. 427/282 |
| 2006/0235417 | A1 | * | 10/2006 | Sala ............................ 606/79 |

FOREIGN PATENT DOCUMENTS

| | | | | |
|---|---|---|---|---|
| JP | 2001009584 | A | * | 1/2001 |
| JP | 2003200354 | A | * | 7/2003 |

* cited by examiner

*Primary Examiner*—David P Bryant
*Assistant Examiner*—Eric A Gates
(74) *Attorney, Agent, or Firm*—Pillsbury Winthrop Shaw Pittman LLP

(57) ABSTRACT

The process provides an expandable chuck with a variable diameter bulb having a variable wall thickness, the chuck being operatively designed to stretch the bulb to reduce its diameter for insertion into a photoreceptor pipe and upon relaxation to compress the bulb so as to increased diameter. The design solves provides a universal chuck to reduce the cost of changing to different diameter chucks in accommodating different size photoreceptors during the coating and drying process.

16 Claims, 2 Drawing Sheets

EXPANDABLE CHUCK

BACKGROUND

All references cited in this specification, and their references, are incorporated by reference herein in their entirety where appropriate for teachings of additional or alternative details, features, and/or technical background.

Disclosed in the embodiments herein is an expandable chuck device for inserting into, holding and sealing a photographic imaging device during dip coating and drying operation.

Electrophotographic imaging members are known. Electrophotographic imaging members include photosensitive members, known as photoreceptors. Photosensitive members commonly utilized in electrophotographic (xerographic) processes may comprise, for example, a flexible belt or a structure such as a rigid drum.

Rigid electrophotographic imaging members, including drums or pipes, may be coated by many different techniques such as spray coating, immersion and dip coating. Dip coating is a coating method typically involving dipping a substrate in a coating solution, such as organic photoconductor coating, and taking up the substrate for the drying step. In dip coating, the coating thickness depends on the concentration of the coating material and the take-up speed (i.e., the speed of the substrate being lifted from the surface of the coating solution). It is known that the coating thickness generally increases with the coating material concentration or viscosity and with the take-up speed.

One method for dip coating electrophotographic cylinders, pipes or drums to form an organic photoconductor layer thereon comprises obtaining a drum having an outer surface to be coated, an inner surface wall defining a void, and an upper opening end and a lower opening end in communication with the void, immersing the drum in a flowing liquid coating material while maintaining the axis of the drum in a vertical orientation, maintaining the outer surface of the drum in a concentric relationship with the vertical interior wall of the cylindrical coating vessel while the drum is immersed in the coating material, the outer surface of the drum being radially spaced from the vertical interior wall of the cylindrical coating vessel, maintaining laminar flow motion of the coating material as it passes between the outer surface of the drum and the vertical interior wall of the vessel, and withdrawing the drum from the coating vessel.

An electrophotographic receptor drum may have the form of a relatively narrow cylinder or pipe. As coating of only the outside of a photoreceptor drum may be desired, in particular to avoid loss of the coating solution, a plug may be affixed at the top end of an electrophotographic drum before the immersion into the coating substance to prevent the coating substance from entering the void due to positive air pressure therein. A chuck member may be relied upon both to seal the top of the photoreceptor drum to prevent fluid from entering the opening in the drum by displacing air in the opening (i.e., the chuck member acting as a plug) and also carry it through this entire operation. The chuck may have a seamless plug shape to prevent the coating solutions from penetrating inside the drum by air leaking along the seam. The chuck device may be configured to have a stem portion anchored in the plug portion. The plug portion is inserted in the open top end of the photoreceptor drum and connected to a carrier assembly for transporting the photoreceptor through the coating and drying operation.

The use of a single rubber bladder for sealing the drum and for moving the drum from one process step to another has worked very well over the years but has the disadvantage of not allowing different diameters of photoreceptors to be coated using a single chuck. In fact, the solid or inflatable chuck system requires a specifically fitted single chuck for each of the different size diameter drums. As a consequence, multiple different diameter photoreceptors cannot be treated and transported through the same installation. As part of the task of coating different diameter photoreceptors, a plant operation may require that the individual chucks must be continually exchanged or "changed out", commensurate with the size and number of the different photoreceptor tubes. Chucking devices used in production may use a compressed "doughnut" to perform these functions. Many new products being scoped for dip coating production have varying diameters (i.e., 24, 40, 60 mm). Of course, if there are, for example, 1200 chucks in each of say two dip coating production lines and three different drum diameters are scoped to be coated, changing over all of these chucks would not be a trivial matter. This complicated aspect of the operation of the coating/drying process can be very time-consuming as well as adding to the cost of such a facility by the requirement of a great number of differently sized chucks. Moreover, the single diameter chucks are expensive and require substantial downtime for change-over.

There is also a labor cost in changing chucks from one diameter to the next. There is also a material loss expected in changing out chucks due to incorrectly installed chucks resulting in the simultaneous loss of several photoreceptor drums and down time required for repair and recovery. When using single diameter chucks, every time a drum photoreceptor of a different diameter is coated, all of the chucks must be changed over to the new size. For example, chucking of a drum photoreceptor for coating involves gripping the pipe with sufficient forces to prevent movement, pull-off or rotation during processing. Chucking must seal the inner wall of the pipe to prevent solution from filling the interior. Chucks must also locate the pipe at a specific point and ensure the pipe is vertically plumb. All of these conditions frequently must be met in environments of solvent laden air, high temperature and humidity, and in a Class 100 clean-room.

A universal coating chuck would require no change-over or downtime. It is therefore one object of the present invention to develop a Universal Coating Chuck which uses a "bulb-type" gripping member. This bulb is molded in the larger diameter state, such that to reduce the chuck diameter for insertion into the inner diameter of the pipe, it needs to be pulled axially.

REFERENCES

Reference is made to United States patents which disclose dip-coating a rigid cylindrical assembly with an electrophotographic coating solution.

U.S. Pat. No. 5,788,774 to McCumiskey et al., issued Aug. 4, 1998, discloses a substrate coating assembly employing a plug member for selectively coating a hollow cylindrical substrate wherein the plug member is fabricated from a non-wetting material.

U.S. Pat. No. 5,693,372 to Mistrater et al., issued Dec. 2, 1997, describes a process for dip coating drums comprising providing a drum having an outer surface to be coated, an upper end and a lower end, providing at least one coating vessel having a bottom, an open top and a cylindrically shaped vertical interior wall having a diameter greater than the diameter of the drum, flowing liquid coating material from the bottom of the vessel to the top of the vessel, immersing the drum in the flowing liquid coating material while maintaining the axis of the drum in a vertical orientation, maintaining the outer surface of the drum in a concentric relationship with the vertical interior wall of the cylindrical coating vessel while the drum is immersed in the coating material, the outer surface of the drum being radially spaced from the vertical interior wall of the cylindrical coating vessel, maintaining laminar flow motion of the coating material as it passes between the outer surface of the drum and the vertical interior wall of the vessel, maintaining the radial spacing between the outer surface of the drum and the inner surface of the vessel between about 2 millimeters and about 9 millimeters, and withdrawing the drum from the coating vessel.

U.S. Pat. No. 5,725,667 to Petropoulos et al., issued Mar. 10, 1998, discloses a dip coating apparatus including: (a) a single coating vessel capable of containing a batch of substrates vertically positioned in the vessel, wherein there is absent vessel walls defining a separate compartment for each of the substrates; (b) a coating solution disposed in the vessel, wherein the solution is comprised of materials employed in a photosensitive member and including a solvent that gives off a solvent vapor; and (c) a solvent vapor uniformity control apparatus which minimizes any difference in solvent vapor concentration encountered by the batch of the substrates in the air adjacent the solution surface, thereby improving coating uniformity of the substrates.

U.S. Pat. No. 6,214,419 to Dinh et al., discloses a process for immersion coating of a substrate including positioning a substrate having a top and bottom within a coating vessel having an inner surface to define a space between the inner surface and the substrate, filling at least a portion of the space with a coating mixture; stopping the filling slightly below the top of the substrate, initiating removal of the coating mixture at a gradually increasing rate to a predetermined maximum flow rate in a short predetermined distance, and continuing removal of the coating mixture at substantially the predetermined maximum flow rate to deposit a layer of the coating mixture on the substrate.

U.S. Pat. No. 5,829,759 to Swain et al. issued Nov. 3, 1998 discloses a chuck assembly for engaging the inner surface of a hollow substrate comprising a housing having an open end and defining a passageway in communication with the open end; a partially hollow elastic boot defining an entry hole and an inner surface wherein the boot when stretched decreases in cross-sectional dimension, and wherein the boot engages the housing, whereby the hollow portion of the boot is in communication with the passageway; and a movable, boot stretching member disposed in the passageway and adapted to engage the inner surface of the boot, wherein movement of the member in a direction to stretch the boot decreases the cross-sectional dimension of the boot, thereby permitting insertion of the boot into the substrate, and wherein movement of the member in the opposite direction increases the cross-sectional dimension of the boot, thereby permitting engagement of the boot against the inner surface of the substrate.

SUMMARY

Aspects of the invention include:

an expandable chuck comprising a housing having a first open end and a second open end, an inside and an outside surface, inside surface, defining a passageway in communication with the first open end and the second open end; a moveable plunger assembly comprising a first portion exterior to the first opening end of the housing having an a terminal end, a second portion extending through the passageway of the housing, and a third portion exterior to the second opening end of the housing and terminating in an expanded end; a stretchable hollow bulb defining a first open end and a second open end, wherein the bulb comprises a wall of varying thickness having an inner surface, defining a cavity, and an outer surface, and wherein the first open end of the bulb is in communication with the second open end of the housing and the second open end of the bulb abuts the expanded end of the plunger; wherein the plunger assembly is operationally configured with respect to the bulb to cause the bulb to expand in diameter for a period of time when the terminal end of the first portion of the plunger is moved in a distal direction to the first open end of the housing, and to decrease in diameter for a period of time when the terminal end of the first portion of the plunger is moved in a proximal direction to the first open end of the housing;

an expandable chuck comprising a plunger assembly having a slidable plunger capable of moving in a first direction and a second direction; an elastomeric bulb having an outer surface and an inner surface defining a wall, the inner surface defining a void, and having a first open end and a second open end in communication with the void; wherein the plunger assembly is operatively configured with respect to the elastomeric bulb to cause the void of the elastomeric bulb to elongate above a directional axis when the slidable plunger is moved in the second direction but diminishes along the same directional axis when the slidable plunger is moved in the first direction; and wherein the elastomeric bulb walls are configured to be thicker at the first open end and the second open end than wall at a midpoint between first and second open end; and a chuck and photoreceptor drum assembly comprising a drum photoreceptor having an outer surface and an inner surface defining a wall, the inner surface defining a void, and a first open end and a second open end; an elastomeric bulb positioned in the void of photoreceptor, the elastomeric bulb having an outer surface and an inner surface defining a wall, the inner surface defining a void, and having a first open end and a second open end; wherein the elastomeric bulb wall is thicker near the first and second open end of the bulb than at a point between first and second open end; and a plunger assembly attached to the elastomeric bulb capable of altering the shape of the void of the bulb, a portion of the plunger assembly extending from the first or the second open end of the drum photoreceptor.

BRIEF DESCRIPTION OF THE DRAWINGS

In the detailed description reference is made to the illustrative figures listed below.

Figure 1:
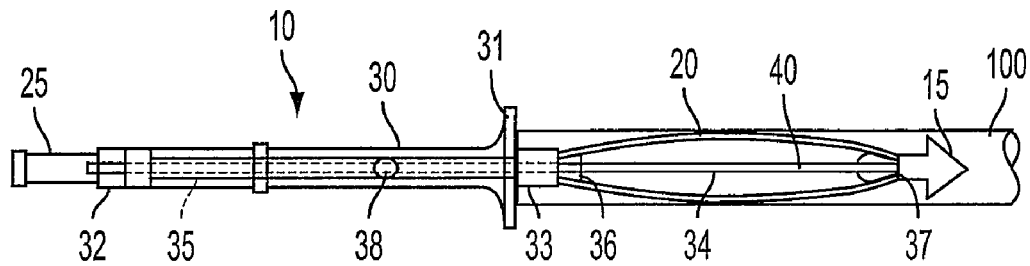
FIG. 1 illustrates an initial expanded stage cross-sectional length diagram of one embodiment of the universal expandable chuck device.

Other aspects of the present invention will become apparent as the following description proceeds and upon reference to the Figures which represent preferred embodiments.

DETAILED DESCRIPTION

In embodiments there is illustrated a variable wall thickness, variable diameter expandable universal chuck device for holding and sealing a rigid or flexible substrate having a void of different cross-sectional dimensions, allowing for processing in one operation. The embodiments of such substrate may be variously described in terms of a substantially cylindrical housing such as a pipe, tube or drum. Such a substrate may be understood to include drum-type electrophotographic imaging members. Such chucks may be used for the immersion-coating or dip-coating of drum-type electrophotographic imaging members, and the subsequent transport for drying of the substrate.

In one embodiment, a universal coating chuck having sealing and holding properties comprises a flexible "bulb-type" gripping member so as to fit a variable diameter number of substrates. A bulb according to the embodiment of this invention is molded in the larger diameter state. The bulb is attached to a plunger assembly operationally configured to reduce the cross-sectional diameter of the bulb enough for fitting slidingly into the inside diameter of a pipe, tube or drum when the plunger of such assembly is pulled axially away from the bulb, but to allow for an increase in the cross-sectional diameter of the bulb when the assembly is pulled toward the bulb.

Attempts to use a bulb molded in a smaller diameter state and compressing it to achieve a larger diameter have resulted in devices wherein the bulb material tends to fold over on itself, rather than to expand. It has also been found that in embodiments wherein bulbs are decreased in inner diameter, when a uniform wall thickness "bulb" is utilized, the stretching of the elastic material may also be uniform, thereby causing "scalloping" of the cross-sectional diameter as it is reduced. This may compromise the seating of the bulb, preventing the sealing of the inside diameter of the pipe with the bulb.

A variable wall thickness of bulb modeled using a Finite Element Analysis was found to overcome the problem associated with uniform wall thickness. Thus by selectively changing the wall thickness of the bulb, one can affect the deformity of the bulb in a selective manner to allow for gripping, sealing and locating various inside diameter pipes for processing.

Aspects disclosed herein include a universal coating chuck utilizing a variable wall thickness, variable diameter silicone rubber bulb molded in a large diameter state operatively configured in the chuck with a plunger such that when the plunger is pushed axially, the diameter of the bulb is reduced for insertion into a photoreceptor pipe while when it is pulled axially, the diameter of the bulb increases to allow for contact of the bulb with the drum, tube, etc., into which it is inserted. The bulb may be allowed to be compressed to fit within the pipe and then relaxed within the pipe to effectively grip, seal, and locate the pipe during coating and drying steps. The universal chuck may include a full range of flexibility, for example, without limitation, 24 to 60 mm diameters.

Coating mixtures in dip coating may comprise materials typically used for any layer of a photosensitive member including such layers as a subbing layer, a charge barrier layer, an adhesive layer, a charge transport layer, and a charge generating layer, such materials and amounts thereof being illustrated for instance in U.S. Pat. Nos. 4,265,990, 4,390,611, 4,551,404, 4,588,667, 4,596,754, and 4,797,337.

The desired elasticity of the bulb-like gripping means material may be achieved using a rubber-like compound selected, among others, from silicon rubber and an elastic polymer. For example, an adjustable diameter silicon rubber chuck may be configured to fit all sizes of organic photoconductor that are immersion- or dip-coated in a high-density dip operation. The universal chuck bulb may be molded in a large diameter shape and then stretched to reduce the diameter for insertion into the photoreceptor drum.

FIG. 1 shows one embodiment of an expandable chuck device 10 comprised of a hollow housing portion 30 and a bulb portion 20. The housing portion 30 has an open first end 32 and a second open end 33 encasing a passageway 35 for axially housing a movable stretching device which includes in sequence, an actuator portion 25, a shaft portion 34, a bulb stretching portion 40, and a tip portion 15. The bulb 20 may be engaged at its first open end 36 to the housing second end 33 and at its second end 37 to the tip member 15 of the bulb-stretching portion 40, for example, by threads. The chuck housing 30 may be in the general configuration of a hollow tube, pipe or other approximately cylindrical configuration having open ends. The contour of the cross-section of the bulb member 20 is diagrammed in the stretched configuration so as to slidingly fit inside a substrate member, in particular, a photoreceptor drum substrate 100. Proximal to the housing second end portion 33, an affixed flange or ring washer 31 may be configured to facilitate a stop for a measured length insertion of the chuck device 10 into the substrate end (not shown), the inserted chuck device 10 thus including mainly the bulb portion 20 inside the substrate. The housing 30 preferably is an integral piece, especially a single piece. According to one embodiment, the cone-shaped tip portion 15 may have a smaller cross-sectional dimension than the rest of the substrate whereby the cone shape is intended to facilitate easier insertion of the chuck device into the photoreceptor drum substrate.

Figure 2:
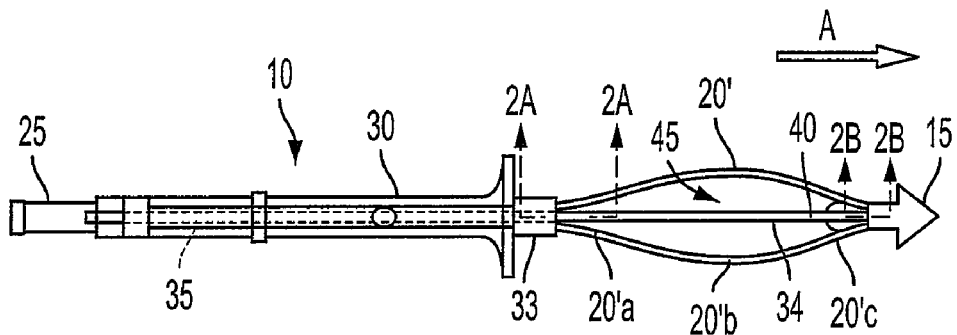
FIG. 2 illustrates a further expanded stage cross-sectional length diagram of one embodiment of the universal expandable chuck device; where
Figure 3:
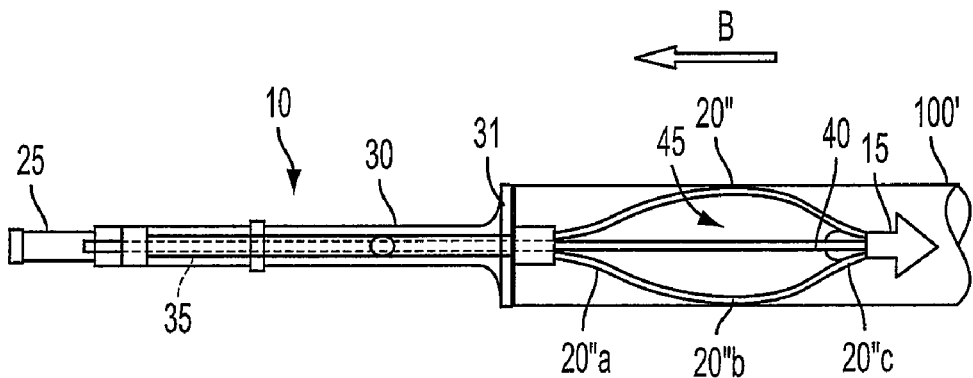
FIG. 3 illustrates another, more fully expanded stage cross-sectional length diagram of one embodiment of the universal expandable chuck device.

FIGS. 2 and 3 disclose different expansion states of an expandable chuck embodiment in FIG. 1. Specifically, FIG. 2 is diagramed to show a bulb configuration at partial expansion achieving an intermediate cross-sectional diameter. The embodiment provides an intermediate compression or expansion adjustment of bulb 20' involving repositioning of the stretching rod 34 and moving the stretching actuator 25 away from the bulb end thereby effectively withdrawing the tip portion 15 from an interior space of a particular sized substrate interior space (not shown) and shortening the length of the bulb (stretching device portion 40 that is encased within an interior or void 45 of the bulb 20. FIG. 3 is a diagram illustrating the bulb member 20" at its fullest expansion such that the bulb 20" may tightly grip and hermetically seal the interior space of a relatively large diameter photoreceptor drum substrate 100'.

The chuck housing 30 may be fabricated from a material which has one or more of the following properties: high temperature resistance, low mass, minimal heat sinking, rigidity with resilient strength, and durability. Suitable materials to fabricate such a the structure may include, for instance, a plastic like ULTEM™; (a polyetherimide resin) and VALOX™ (a thermoplastic polyester resin), both available from the General Electric Company, or a metal like aluminum, stainless steel, iron, nickel, copper, or bronze. The housing 30 of the chuck embodiment shown may include a plurality of slots or holes 38 through the housing and extending to the open first end 32 of the housing 30.

The bulb 20 is preferably fabricated from a material having one or more of the following properties: high temperature resistance, elasticity, and durability. The bulb material may be any suitable polymeric composition including an elastomer as for example silicone rubber (e.g., silicone rubber compound no. 88201 available from Garlock Division of Coltec Industries), VITON™, or the like. The bulb member may be fabricated from an elastic material having the same hardness value throughout the bulb body. In a preferred embodiment, however, the material of the bulb ends at or near the housing attachment areas 20'a, 20'c (20"a, 20"c), is progressively thicker than the material of the bulb middle section 20'b (20"b). For instance, this substantial portion of the bulb may have a durometer numerical hardness ranging from about 25 to about 40, or about 35; the end sections of the bulb member may have a durometer hardness ranging from about 45 to about 60, or about 50. The sections having different degrees of hardness may be the same or different material. This dual material thickness and resulting durometer hardness affords retention of the bulb inside the substrate during the chucking operation and minimizes or eliminates the need to use a separate clamp to secure the chuck to the substrate.

Figure 2A:
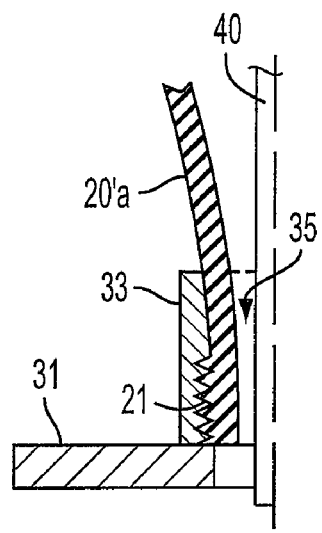
FIG. 2A illustrates a cross-section of FIG. 2 along line 2A-2A.

FIG. 2A illustrates a cross-section of FIG. 2 along line 2A-2A, detailing an embodiment of the bulb 20 and the housing 30 where the engaged surfaces of both the bulb first end 36 and the housing second end 33 include threads 21 to promote retention of the bulb 20 to the housing 30 during the chucking operation and to minimize or eliminate the need to use a separate clamp to hold the bulb to the housing. In embodiments of the instant invention, either the outside surface of the end portion 33 of the housing or the inner surface of the first end section 36 of the bulb, or both, contain threads 21. In embodiments, a metal or hard plastic threaded insert can be molded or positioned into the bulb ends 36 and 37, in which case, the threaded insert is considered herein as a part of the bulb 20. Threading increases the amount of the bulb 20 that contributes to the retention forces by requiring more of the bulb end to stretch radially before the bulb will slip off the housing.

In the process of operation, the bulb-stretching member 40 (e.g. shown in FIG. 1) in the form of a rod is axially positioned in the passageway 35 and adapted to engage the inner surface of the distal bulb end or second bulb end 37 adjacent the tip 15, the proximal bulb end or bulb first end 36 is preferably attached to the second chuck housing end 33. The stretching member 40 is preferably a single integral piece and may be fabricated from wood, plastic or a metal such as stainless steel, aluminum, or iron. In embodiments, the shaft portion 34 of the stretching member 40 may be a solid or hollow rod.

Figure 2B:
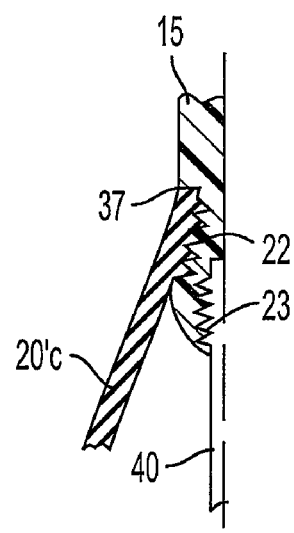
FIG. 2B illustrates a cross-section of FIG. 2 along line 2B-2B.

FIG. 2B illustrates a cross-section of FIG. 2 along line 2B-2B, detailing an embodiment of the tip 15 of the bulb stretching member 40 engaged to the bulb 20 by threads 22. The tip 15 may be engaged to the bulb stretching member 40 by threads 23. The advantage of coupling the stretching member 40 to the bulb 20 is that one can increase the cross-sectional dimension of the boot by proximal movement of the member actuator 25 to effect a size that is generally impossible to attain by relying solely on the inherent elastic or restorative properties of the bulb material after stretching, not to mention the concomitant hysteresis effect usually encountered by this deformation. In essence, by coupling the stretching member to the bulb, one can compress or expand the bulb by pulling the stretching member in a proximal position to achieve the desired wider cross-sectional dimension and thus provide more holding or clinging force. To effect efficient coupling of the member to the distal bulb end surface, one may also contemplate employing an adhesive or any other suitable method and device.

Operation of the embodiments depicted in FIGS. 1-3 may proceed as follows. The bulb stretching member 40 moves in the tip 15 in a forward direction A to push against the second bulb end 37, thereby stretching the bulb 20 into a substrate accommodating configuration, thereby reducing the cross-sectional dimension or radial dimension of the bulb 20. The bulb 20 now having the reduced cross-sectional dimension, is inserted into the substrate 100, 100'. To achieve the desired holding force the bulb stretching member 40 is moved in the reverse direction B, allowing the bulb 20 to expand, thereby increasing the cross-sectional diameter of the bulb 20 to allow engagement with the inner surface of the substrate and lifting of the substrate to provide a positive seating on the chuck housing 10 due to pressure of the bulb expansion as well as the inherent elastic and frictional properties of the bulb material. After processing of the substrate, the actuator 25 of the bulb-stretching member 40 is again moved in the forward direction A thereby lengthening the bulb contour 20 and shrinking its width diameter. The configuration effects pulling the bulb outside surface away from the inner surface of the substrate and allowing withdrawal of the chuck device 10 from the substrate.

During engagement of the chuck device 10 shown in FIGS. 1-3 with a different size substrate 100, 100', it is preferred that a hermetic seal is created by contact of the bulb outer surface material against the substrate inner surface to minimize or prevent fluid migration, especially liquid, into the interior of the substrate.

The chuck device of the present invention may provide several advantages. For example, the expandable bulb chuck may embody low mass and therefore may not cause excessive heat flow from a thin substrate to the chuck assembly when placed in an oven. Also, the cost of the expandable chuck may be low due to the non-precision requirements and the application of molded parts, thereby greatly minimizing the need for machining. The cost savings may be large when hundreds or thousands of the chuck devices are required.

Any suitable rigid or flexible substrate may be held by the substrate holding apparatus of the present invention. The substrate may have a cylindrical cross-sectional shape or a noncylindrical cross-sectional shape such as an oval shape. The substrate may be at least partially hollow, or entirely hollow, with one or both ends being open. In certain embodiments, the substrate is involved in the fabrication of photoreceptors and may be bare or coated with layers such as photosensitive layers typically found in photoreceptors. Due to possible wide range of diameter adjustments afforded by the expandable bulb provision of the embodiments, the processed substrate may have any suitable dimensions.

While the invention has been particularly shown and described with reference to particular embodiments, it will be appreciated that variations of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims.

What is claimed is:

1. An expandable chuck for holding substrates of various inside diameters, comprising
    (a) a housing having a first end and a second end, an inside and an outside surface, said inside surface, defining a passageway in communication with said first end and said second end;
    (b) a moveable plunger assembly comprising a first portion exterior to said first end of said housing having a terminal end, a second portion extending through said passageway of said housing, and a third portion exterior to said second end of said housing and terminating in an expanded end;
    (c) a stretchable hollow bulb defining a first end and a second end, wherein said bulb comprises a wall of varying thickness having an inner surface, defining a cavity, and a substantially smooth and continuous outer surface, the inner and outer surfaces being substantially in fluid isolation from each other, and wherein the first end of said bulb engages said second end of said housing and the second end of said bulb abuts said expanded end of said plunger, whereby the entire bulb is external to said housing; and (d) a stop device comprising a ring-like flange radially extending from the outside surface of said housing and positioned at a location proximate to the second end of said housing, wherein the stop device is configured to abut an outside surface of the substrate and facilitate a stop for a measured length insertion into the substrate;

wherein said plunger assembly is operationally configured with respect to said bulb to cause said bulb to expand in diameter for a period of time when said terminal end of said first portion of said plunger is moved in a distal direction to said first end of said housing so as to form a hermetic seal by contact of an outer surface of the bulb against an inner surface of the substrate to prevent fluid migration into the interior of the substrate, and to decrease in diameter for a period of time when said terminal end of said first portion of said plunger is moved in a proximal direction to said first end of said housing.

2. A chuck in accordance with claim 1, wherein the housing is a hollow tube, pipe, or drum.

3. A chuck in accordance with claim 1, wherein the housing defines a housing wall and a plurality of holes in said housing wall.

4. A chuck in accordance with claim 1, wherein second end of said housing is threaded to said bulb.

5. A chuck in accordance with claim 1, wherein the bulb comprises a wall material with increasing thickness toward the first and second bulb ends.

6. A chuck in accordance with claim 1, wherein said plunger assembly comprises a rod.

7. A chuck in accordance with claim 1, wherein the expanded end of said third portion of said plunger is a cone shape tip.

8. A chuck in accordance with claim 1, wherein the midsection of said bulb between said first end and said second end is dimensioned relatively thin and the bulb first and second portions are dimensioned relatively thick.

9. A chuck in accordance with claim 1, wherein said bulb comprises an elastic polymer.

10. A chuck in accordance with claim 9, wherein said elastic polymer is selected from the group consisting of: a polyetherimide resin, and a polyester resin.

11. A chuck in accordance with claim 1, wherein the midsection of said bulb between said first end and said second end has a durometer numerical hardness ranging from about 25 to about 40 and the bulb first and second portions have a durometer hardness ranging from about 45 to about 60.

12. An expandable chuck for holding substrates of various inside diameters, comprising:

(a) a housing having a first end and a second end, an inside and an outside surface, said inside surface, defining a passageway in communication with said first end and said second end;

(b) a plunger assembly having a slidable plunger capable of moving in a first direction and a second direction within the passageway of said housing and terminating in an end exterior to the second end of said housing;

(c) an elastomeric bulb having a substantially smooth and continuous outer surface configured to form a hermetic seal against an inner surface of the substrate to prevent fluid migration into the interior of the substrate, and an inner surface defining a wall, the inner and outer surfaces being substantially in fluid isolation from each other, said inner surface defining a void, and having a first end and a second end in communication with said void, wherein the first end of the bulb engages said second end of the housing and the second end of the bulb abuts the end of the plunger, whereby the entire bulb is external to said housing; and (d) a stop device comprising a ring-like flange radially extending from the outside surface of said housing and positioned at a location proximate to the second end of said housing, wherein the stop device is configured to abut an outside surface of the substrate and facilitate a stop for a measured length insertion into the substrate;

wherein said plunger assembly is operatively configured with respect to said elastomeric bulb to cause said void of said elastomeric bulb to elongate along a directional axis when said slidable plunger is moved in said second direction but diminishes along the same directional axis when said slidable plunger is moved in said first direction; and wherein said elastomeric bulb walls are configured to be thicker at said first end and said second end than said wall at a midpoint between said first and second end.

13. A chuck in accordance with claim 12, wherein said plunger assembly comprises a rod.

14. A chuck in accordance with claim 12, wherein said elastomeric bulb comprises an elastomeric polymer.

15. A chuck in accordance with claim 14, wherein said elastomeric polymer comprises a polyetherimide resin or a polyester resin.

16. A chuck in accordance with claim 12, wherein said elastomeric bulb is attached to said plunger assembly by a threaded engagement.

* * * * *